United States Patent [19]
Fujimoto

[11] Patent Number: 6,024,662
[45] Date of Patent: Feb. 15, 2000

[54] CRANK ARM SET

[75] Inventor: Tadao Fujimoto, Sakai, Japan

[73] Assignee: Shimano Inc., Osaka, Japan

[21] Appl. No.: 08/798,266

[22] Filed: Feb. 11, 1997

[30] Foreign Application Priority Data

Feb. 20, 1996 [JP] Japan .................................. 8-031628

[51] Int. Cl.$^7$ .......................... F16H 57/02; F16H 55/30; G05G 1/14; B62M 1/02
[52] U.S. Cl. ....................... 474/144; 474/160; 74/594.2; 280/261
[58] Field of Search ................... 474/144, 152, 474/158, 160; 74/594.1, 594.2; 280/260, 261

[56] References Cited

U.S. PATENT DOCUMENTS

| | | | |
|---|---|---|---|
| 3,550,465 | 12/1970 | Maeda | 474/160 |
| 4,106,357 | 8/1978 | Segawa | 474/160 |
| 4,425,824 | 1/1984 | Koch | 74/594.2 |
| 4,439,172 | 3/1984 | Segawa | 474/160 |
| 4,594,910 | 6/1986 | Nagano | 74/594.2 |
| 4,741,724 | 5/1988 | Wang | 474/160 |
| 5,194,051 | 3/1993 | Nagano | 474/160 |
| 5,197,353 | 3/1993 | Trenerry et al. | 74/594.1 |
| 5,213,550 | 5/1993 | Wu | 474/160 |
| 5,242,028 | 9/1993 | Murphy et al. | 74/594.2 |
| 5,314,366 | 5/1994 | Palm | 474/160 |
| 5,644,953 | 7/1997 | Leng | 74/594.2 |

FOREIGN PATENT DOCUMENTS

| | | |
|---|---|---|
| 0002964 | 7/1979 | European Pat. Off. . |
| 3831512 | 2/1990 | Germany . |
| 641308 | 3/1948 | United Kingdom . |

OTHER PUBLICATIONS

FC–M737 crank set; *1995 Shimano, Bicycle System Components, Dealer Sales & Support Manual*; pp. 10 and 18.

*Primary Examiner*—Charles A. Marmor
*Assistant Examiner*—Matthew A. Kaness
*Attorney, Agent, or Firm*—Shinjyu Global IP Counselors, LLP.

[57] ABSTRACT

A bicycle chainwheel plate is formed to reduce the weight of a chainwheel crank and to keep its stiffness at a high level. The chainwheel plate is coupled between a crank arm and at least one sprocket. In one embodiment, the crank arm is detachable from the chainwheel plate, while in the second embodiment, the crank arm is integrally formed with the chainwheel plate as a one-piece, unitary member. The crank arm is designed to accommodate a pedal at its free end and is centrally attached to the chainwheel plate at the other end. In the first embodiment, the chainwheel plate comprises a crank attachment portion having a centrally located crank attachment hole in which a crank arm can be fixed in a non-rotatable fashion, four connecting arm portions radially extending in four directions from the crank attachment portion, and chainwheel fixing portions bifurcating and extending outward from the tips of the arm portions. The outer sprocket is shaped as a ring and is fixedly coupled to the chainwheel fixing portions.

14 Claims, 6 Drawing Sheets

CRANK ARM SET

FIELD OF THE INVENTION

The present invention relates to a bicycle chainwheel plate for coupling sprockets to a crank assembly. More specifically, the present invention relates to a one-piece, unitary chainwheel plate with the sprockets fastened thereto.

BACKGROUND OF THE INVENTION

There are many different types of bicycle chainwheel and crank assemblies which are currently available for bicycles. One example of a chainwheel and crank arm is disclosed in Japanese Utility Model Publication 32-14512. This Japanese Publication discloses a three piece chainwheel plate in which the crank connecting arms and the sprockets are coupled together by rivets. Such chainwheel plates have a crank arm with a pedal at its tip, three arm components extending radially in three directions from the base of the crank arm, V-shaped end portions riveted to the tips of the arm components, and two sprockets or chainwheel components of different sizes coupled to the V-shaped end portions. The tips of the V-arms are riveted to the sprockets. Chainwheel plates that are riveted to the sprockets have higher rigidity during rotation than do sprockets bolted to chainwheel plates.

In the aforementioned conventional chainwheel plate, the three arm portion and V-shaped end portions are coupled together by riveting, which concentrates the stress in this portion during rotation. Also, in cases in which affixing is accomplished using three rivets, it is difficult to uniformly distribute force among the three rivets if holes have not been bored sufficiently accurately. Furthermore, the force increases because the rivet connection area lies to the inside of the action point of the force when reaction from the chain is applied to the sprocket. As a result, an attempt to maintain proper rigidity results in larger rivet diameters and an increased weight.

In view of the above, it will be apparent to those skilled in the art that there exists a need for an improved crank set and/or chainwheel plate with high rigidity and minimal weight. This invention addresses this need in the art as well as other needs which will become apparent to those skilled in the art from this disclosure.

SUMMARY OF THE INVENTION

An object of the present invention is to reduce the weight of the crank set and still maintain high rigidity of the sprocket.

Another object of the present invention is to provide a chainwheel plate having a one-piece construction.

The bicycle chainwheel plate pertaining to a first aspect of the present invention is one in which crank arms are designed to accommodate pedals at their tips and can be centrally attached thereto. The chainwheel plate is equipped with a crank attachment portion, a plurality of connecting portions, a plurality of chainwheel fixing portions, and one or more chainwheels or sprockets. The aforementioned crank attachment portion has a centrally located crank attachment hole in which a crank arm can be fixed thereto in a non-rotatable fashion. The connecting arm portions extend radially and outwardly from the crank attachment portions. The chainwheel fixing portions form a plurality of branches extending outward from the tips of the arm portions for attaching the sprockets thereto. In particular, the sprocket components are shaped as rings fixed to the chainwheel fixing portions.

Integration of the crank attachment portion, the arm portions, and the chainwheel fixing portions as a one-piece, unitary member makes it easier to reduce the weight and to maintain the rigidity than when the arm portions and the chainwheel fixing portions are joined together by rivets or other joining means. In addition, the chainwheel fixing portions are divided into a plurality of branches extending from the tips of the arm portions, increasing the number of points where they are fixed to the sprockets and reducing the strain in the sprockets. Furthermore, the crank arm and the chainwheel plate are separate components and therefore can be manufactured from a material different from that of the cranks to further reduce the weight in comparison with that of an integrated crank arm.

The bicycle chainwheel plate pertaining to a second aspect of the present invention is such that the aforementioned chainwheel fixing portions of a chainwheel plate as defined with reference to the first invention bifurcate and extend from the tips of the arm portions. In this case, the number of points at which these components are fixed to the sprockets is twice the number of the arm portions.

The bicycle chainwheel plate pertaining to a third aspect of the present invention is such that a chainwheel plate as defined with reference to the first or second invention is further equipped with a small sprocket attachment point for detachably installing a second sprocket having a smaller diameter than the diameter of the first sprocket within the boundary portion between the arm portions and the chainwheel fixing portions. In this case, the second sprocket is easy to install.

The bicycle chainwheel plate pertaining to a fourth aspect of the present invention is such that the aforementioned arm portions of a chainwheel plate as defined with reference to any of the first through third inventions extend radially in four directions from the aforementioned crank attachment component. In this case, the weight can be reduced and the rigidity maintained at a high level because the number of arm portions is optimal and there is no significant increase in weight.

The bicycle chainwheel plate pertaining to a fifth aspect of the present invention is such that the aforementioned sprockets of the chainwheel plate as defined with reference to any of the first through fourth inventions are riveted to the chainwheel fixing portions. In this case, the rigidity of the sprocket can be maintained at a higher level than when joining is accomplished by using bolts.

The chainwheel crank pertaining to the sixth aspect of the present invention comprises a crank arm, a chainwheel plate and sprockets. The crank arm accommodates a pedal at its free end and is integrally attached to the chainwheel plate at the other end. The chainwheel plate has a plurality of arm portions radially extending from the base of the crank arm, and chainwheel fixing portions forming a plurality of branches and extending outward from the tips of the arm portions. The sprockets are shaped as rings and are fixedly coupled to the chainwheel fixing portions. In this case, the rigidity of the entire chainwheel crank can be enhanced further because the crank component is integrally formed.

The chainwheel plate pertaining to the seventh aspect of the present invention is such that the aforementioned arm portions of a chainwheel crank arm as defined in relation to the sixth invention extend radially in four directions from the base of the aforementioned crank arm.

Other objects, advantages and salient features of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENT

Figure 1:
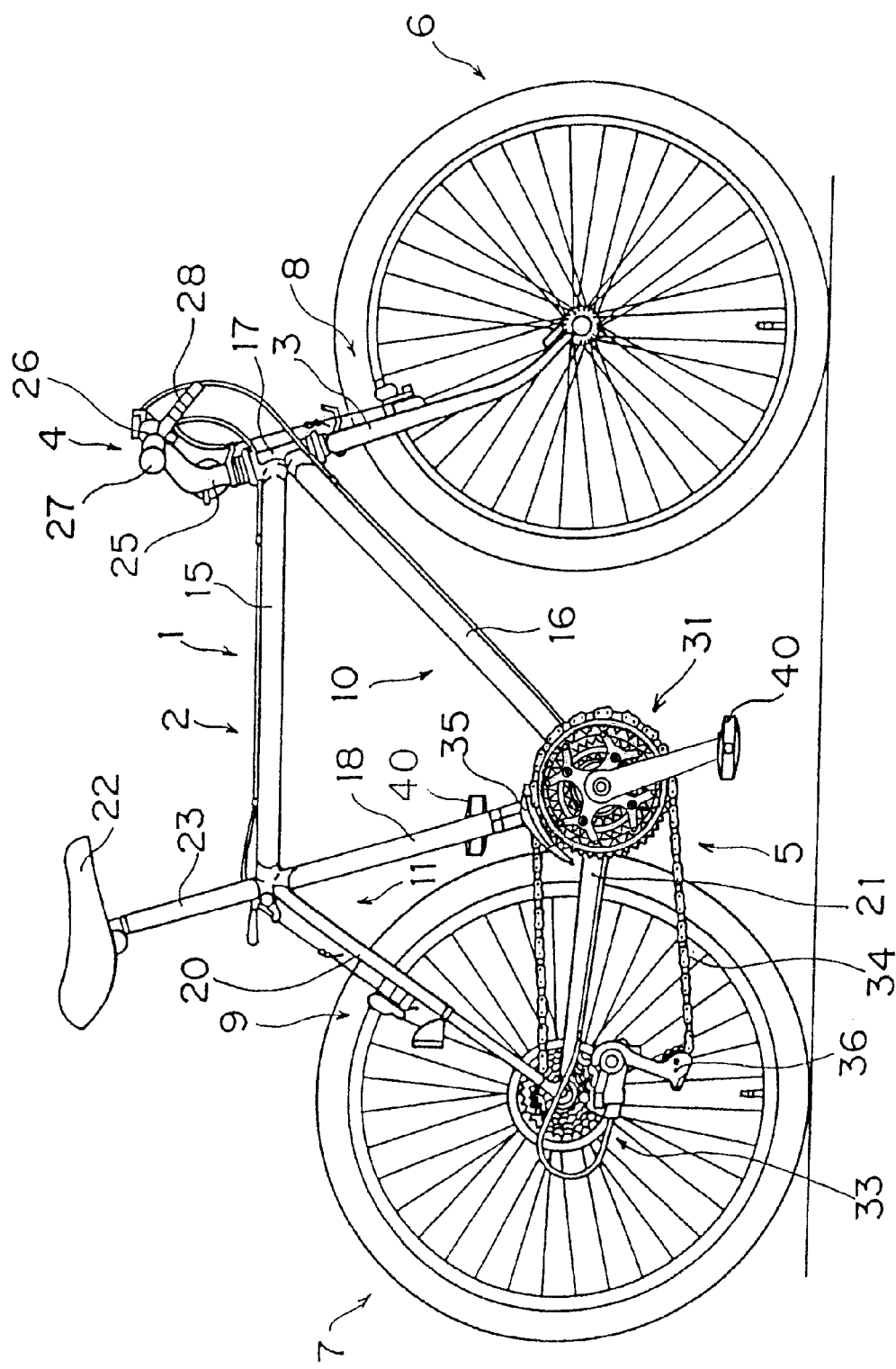
FIG. 1 is a side elevational view of an MTB style bicycle implementing a chainwheel and crank assembly in accordance with a practical embodiment of the present invention.

Referring initially to FIG. 1, a MTB style bicycle is illustrated which is equipped with a diamond-shaped frame 1, which constitutes the skeleton of the bicycle body. The frame 1 comprises a frame body 2 with a Tig welded structure, for example, in the form of an aluminum tube, and a front fork 3 that has a bifurcated lower portion and that is supported while allowed to rotate about an inclined vertical axle in the front portion of the frame body 2. The bicycle further comprises a handlebar component 4 that is linked to the front fork 3, a drive train 5 that is attached to the lower portion of the frame body 2 and that converts pedaling force to drive force, a front wheel 6 that is rotatably supported at the lower end of the front fork 3, a rear wheel 7 that is rotatably supported in the back portion of the frame body 2, and front and back braking devices 8 and 9.

The frame body 2 comprises a front triangle 10 and a back triangle 11 located behind the front triangle 10. The front triangle 10 comprises a horizontally disposed top tube 15, an angled down tube 16 that is located beneath the top tube 15 and that rises toward the front, a head tube 17 for joining the front ends of the top tube 15 and the down tube 16, and a seat tube 18 that rises at an angle and that joins the back ends of the top tube 15 and the down tube 16. A seat post 23 equipped with a saddle 22 is fixed to the seat tube 18 in such a way that the vertical position of the seat post can be adjusted.

Figure 2:
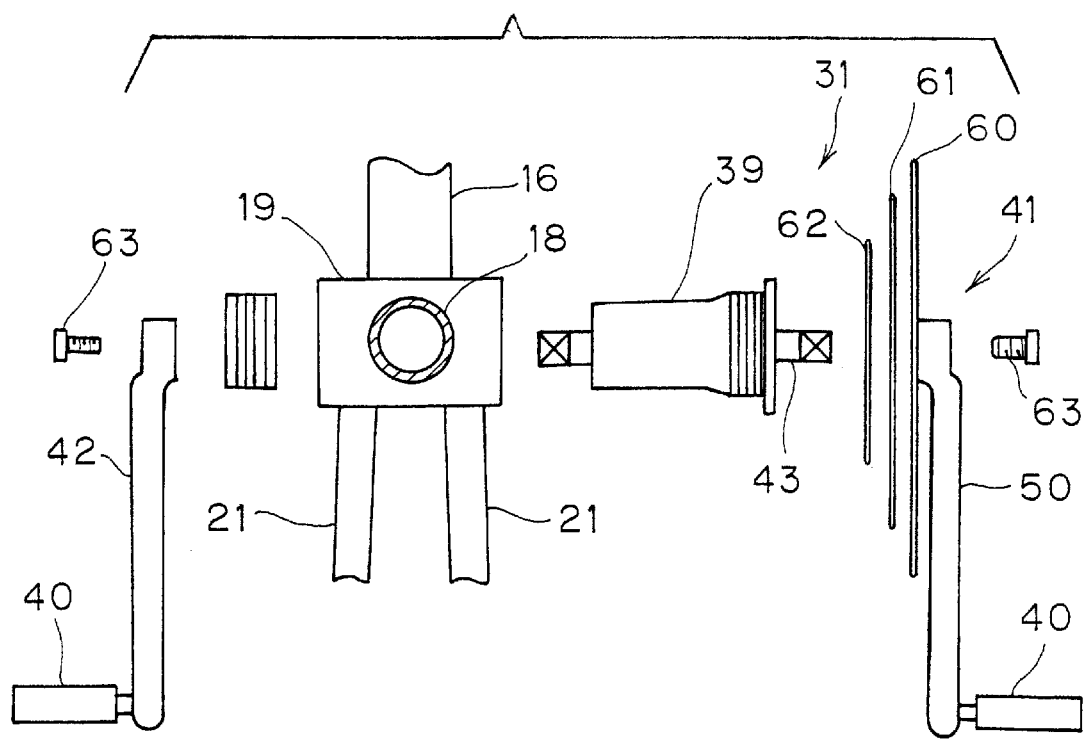
FIG. 2 is an exploded, partial diagrammatic top view of a bicycle chainwheel and crank assembly illustrated in accordance with the present invention.

As seen in FIG. 2, a hanger component 19 is formed at the joint between the seat tube 18 and the down tube 16. Referring to FIGS. 1 and 2, the back triangle 11 comprises a back fork 20 and a chain stay 21. The front end of back fork 20 is joined to the seat tube 18 and slopes down in a bifurcated manner. Chain stay 21 is bifurcated and extends backward from the lower end of the seat tube 18 where it is joined to the back end of the back fork 20.

Referring again to FIG. 1, a handlebar stem 25, which is part of the handlebar component 4, is adjustably fixed to the top portion of the front fork 3 and can be adjusted up and down. A handlebar 26 extending to the right and left is fixed to the top end of the handlebar stem 25. Grips 27 are fitted on the two ends of the handlebar 26. Brake levers 28 equipped with shifting levers are provided on the outside of these grips 27.

The drive train 5 comprises a front chainwheel and crank assembly 31 installed in the hanger component 19, a set of rear chainwheels or sprockets 33 non-rotatably attached to the free hub of the rear wheel 7, a chain 34 that passes over the front chainwheel and crank assembly 31 and the rear chainwheels 33, and front and rear derailleurs 35 and 36 for shifting gears in a conventional manner.

Figure 3:
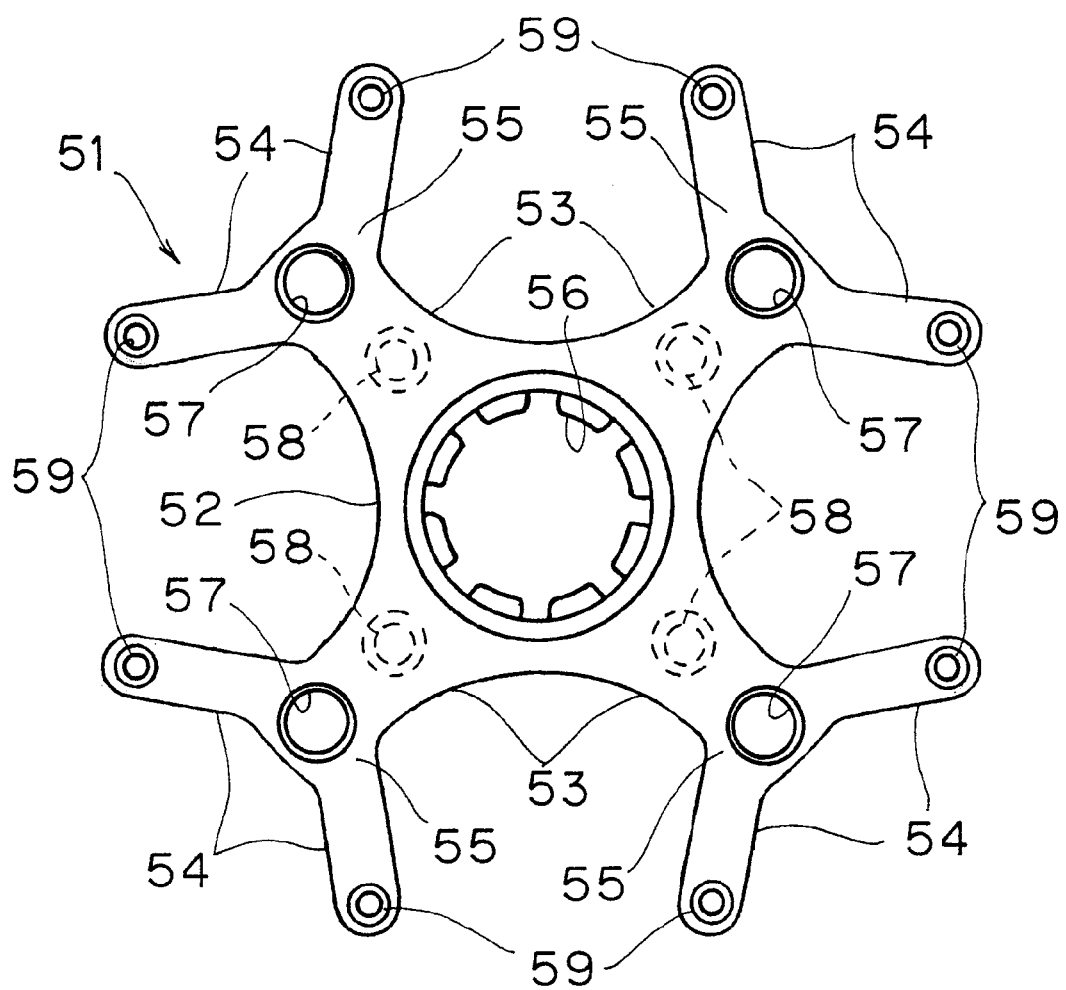
FIG. 3 is a side elevational view of a bicycle chainwheel plate in accordance with the present invention.

As shown in FIGS. 2 and 3, the chainwheel and crank assembly 31 comprises a bottom bracket 39, a right crank set 41 and a left crank arm 42, with pedals 40 (FIGS. 1 and 2) attached to the tip of each crank arm. The bottom bracket 39 connects the right crank set 41 and the left crank arm 42. A spindle 43 is rotatably supported by bottom bracket 39 which in turn is mounted in the hanger component 19 of the frame in a conventional manner.

Referring to FIGS. 2–5, the right crank set 41 comprises a bar-shaped crank arm 50 with one of the pedals 40 mounted on its free end, and a chainwheel plate 51 non-rotatably connected to the base of the crank arm 50. The chainwheel plate 51, as best seen in FIG. 3, is a one-piece, unitary member constructed of a suitable rigid material, such as aluminum alloy or steel. The chainwheel plate 51 comprises a central crank attachment portion 52 to the center of which the crank arm 50 can be attached in a conventional manner through the use of protrusions and indentations, four connecting arm portions 53 extending radially and outwardly-from the crank attachment portion 52, chainwheel fixing portions 54 that bifurcate and extend outward from the tips of the connecting arm portions 53, and a ring-shaped outer chainwheel or sprocket 60 riveted to the eight chainwheel fixing portions 54.

It will be understood by those skilled in the art from this disclosure that chainwheel plate 51 is not a flat plate with a constant thickness. Rather, the outside surface of the chainwheel plate 51 is preferably a non-flat surface with connecting arm portions 53 being curved in the radial direction. Moreover, the inside surface is shaped such that the sprockets 60, 61 and 62 are offset from each other in a conventional arrangement for receiving chain 34 on each of the sprockets 60, 61 and 62.

Figure 4:
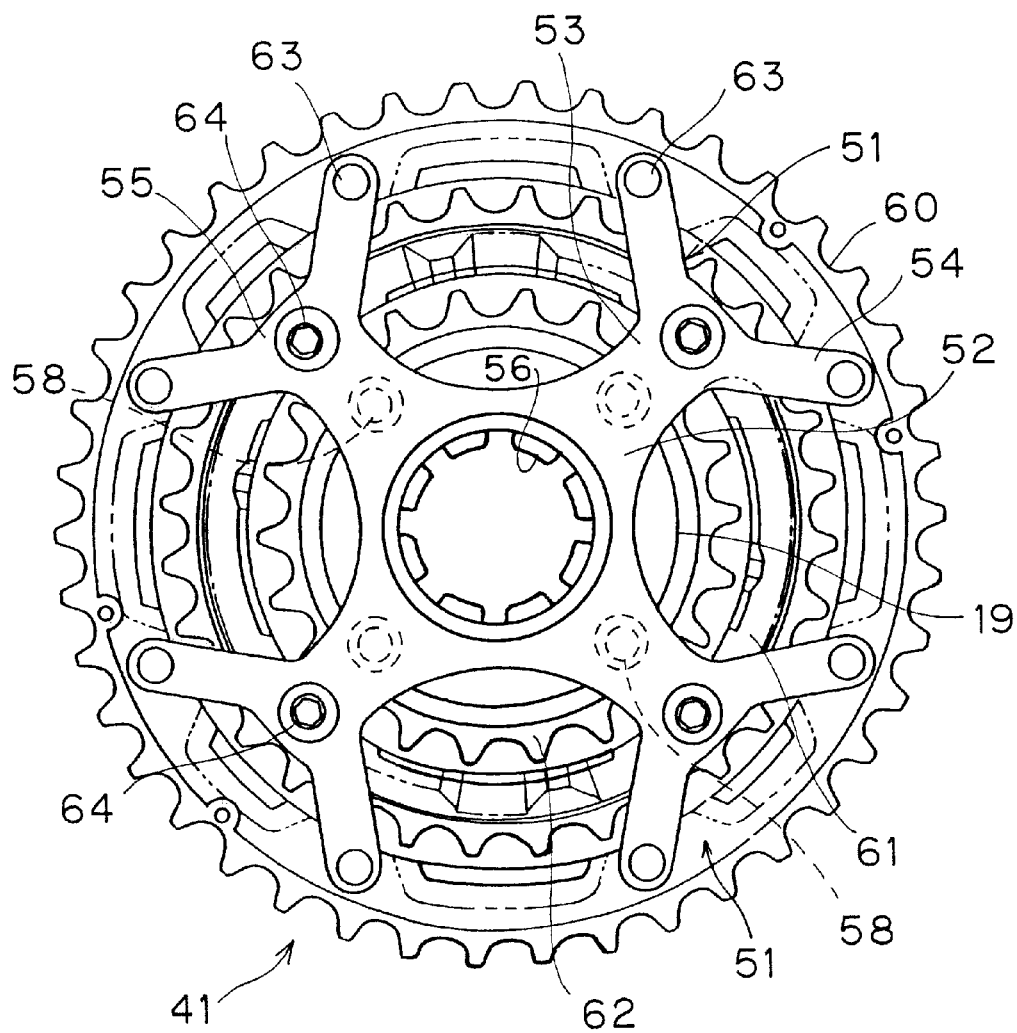
FIG. 4 is a side elevational view of a bicycle chainwheel plate coupled to three sprockets in accordance with the present invention.
Figure 5:
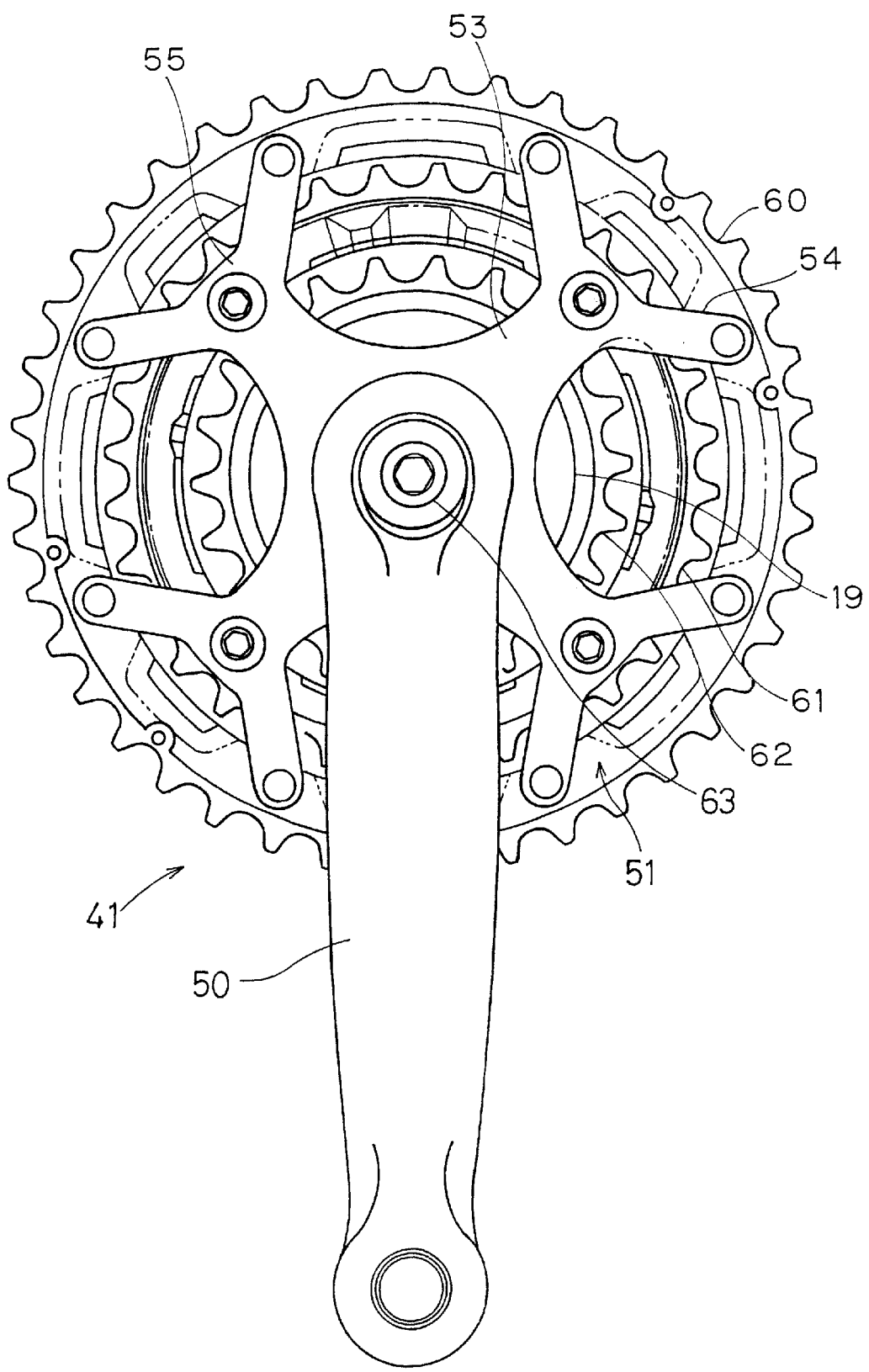
FIG. 5 is a side elevational view of a bicycle crank set in accordance with the present invention.

Referring to FIGS. 3 and 4, a crank attachment hole 56 is formed in the center of the crank attachment portion 52 with serrations or splines for non-rotatably coupling crank arm 50 to the chainwheel plate 51. More specifically, these serrations or splines of attachment hole 56 meshes with the serrations or splines (not shown) formed on the inside of the crank arm 50. In addition, the crank arm 50 and the chainwheel plate 51 are fixed to the spindle 43 of the bottom bracket 39 by fastening the crank arm 50 to the bottom bracket 39 by a crank bolt 63 as seen in FIGS. 2 and 5. Likewise, the crank arm 42 is also fixed to the spindle 43 of bottom bracket 39 by a crank bolt 63 as seen in FIG. 2.

As seen in FIG. 3, each of the chainwheel fixing portions 54 has a hole 59, which aligns with a hole (not shown) formed in outer sprocket 60. A rivet 63 is received in each of the holes 59 of chainwheel fixing portions 54 and the corresponding hole (not shown) of outer sprocket 60 to fixedly couple outer sprocket 60 to chainwheel plate 51. Of course, it will be apparent to those skilled in the art from this disclosure that bolts or other fasteners can be used instead of rivets 63, but rivets are preferred.

As seen in FIG. 3, threaded attachment holes 57 are formed in areas 55 between the connecting arm portions 53 and the chainwheel fixing portions 54. As seen in FIGS. 4 and 5, a center chainwheel or sprocket 61 having fewer teeth than an outer chainwheel or sprocket 60 is attached to the threaded attachment holes 57 via chain ring bolts 64 for coaxially mounting with the outer chainwheel 60. In addition, threaded attachment holes 58 for attaching an inner chainwheel 62 to chainwheel plate 51 are integrally formed on the back surfaces of the connecting arm portions 53.

With the right crank set 41, thus configured, stiffness can be kept at a higher level because of the integrated design of the areas 55 of the chainwheel plate 51 which interconnects connecting arm portions 53 to chainwheel fixing portions 54. In addition, the strain of the outer sprocket 60 is reduced, since the outer sprocket 60 can be firmly fixed to chainwheel plate 51. Moreover, the stiffness of sprocket 60 can be enhanced because the outer sprocket 60 is riveted at eight points with the aid of the bifurcated chainwheel fixing portions 54. Furthermore, constructing chainwheel plate 51 and the sprockets 60, 61 and 62 as separate members makes it possible to design these members to optimum strength using optimum materials for each member, and to maintain proper stiffness in a lightweight structure.

It will be apparent to those skilled in the art from this disclosure that the number of the connecting arm portions 53 is not limited to the illustrated embodiment described above, and can be suitably set in view of stiffness, weight and cost of the desired design.

Alternatively, the chainwheel plate 51 and the crank arm 50 can be integrated as a one-piece, unitary member, rather than separate. In such a case, the number of components is reduced, making it possible to lower the cost. In addition, integrating the crank arm 50 and the chainwheel plate 51 makes it possible to keep the stiffness of the entire right chainwheel crank at a higher level. Of course, the disadvantage to this embodiment is that the crank arm 50 cannot be constructed of a different material than the chainwheel plate 51.

Because the present invention involves integrating the connecting arm portions 53 and the chainwheel fixing portions 54 together as a one-piece, unitary member, it is easier to reduce weight and to maintain proper stiffness than when these portions are joined together by riveting or another joining means. In addition, the chainwheel fixing portions 54 are divided into a plurality of branches extending from the tips of the arm components, increasing the number of points where they are fixed to the chainwheel components and reducing the strain in the chainwheel components. Furthermore, the crank arm 50 and the chainwheel plate are separate components and can therefore be manufactured from a different material from each other to reduce the weight in comparison with an integrated crank set.

Figure 6:
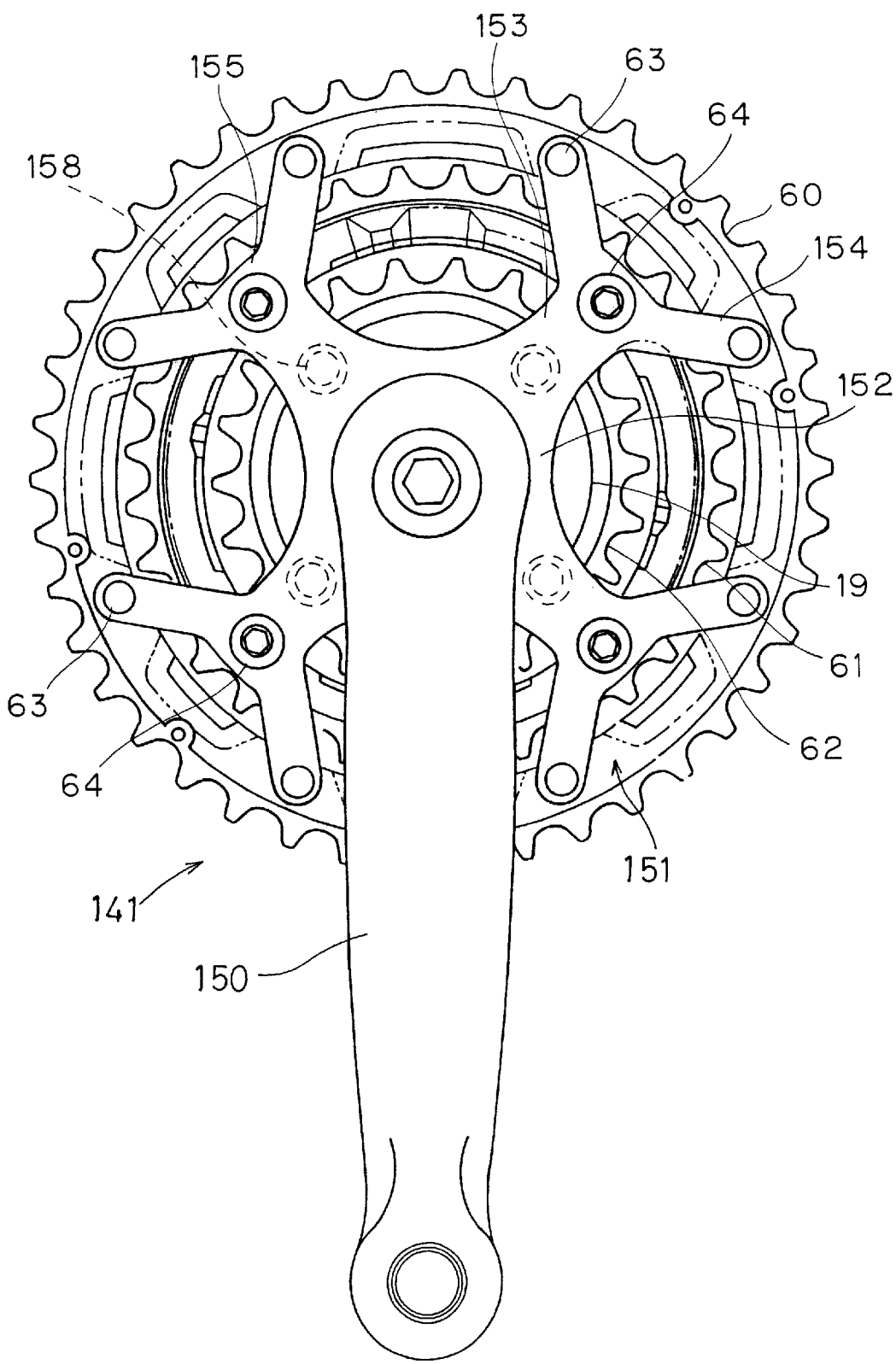
FIG. 6 is a side elevational view of a bicycle crank set in accordance with a second embodiment of the present invention.

Crank Set 141 of FIG. 6

Referring now to FIG. 6, a bicycle crank set 141 in accordance with a second embodiment of the present invention. Crank set 141 is substantially identical to crank set 41 discussed above, except that crank arm 150 and chainwheel plate 151 are integrally formed as a one-piece, unitary member. Since crank set 141 is similar to crank set 41 discussed above, crank set 141 will not be discussed or illustrated in detail herein. Moreover, the same reference numeral utilized in the description of the first embodiment will also be used to identify the same part which is also used in the second embodiment of the present invention.

Crank set 141 comprises a bar-shaped crank arm 150 with one of the pedals 40 mounted on its free end, and a chainwheel plate 151 integrally connected to the base of the crank arm 150. The crank arm 150 and chainwheel plate 151 are integrally formed as a one-piece, unitary member constructed of a suitable rigid material, such as aluminum alloy or steel. The chainwheel plate 151 comprises a central crank attachment portion 152 formed with crank arm 150, four connecting arm portions 153 extending radially and outwardly from the crank attachment portion 152, chainwheel fixing portions 154 that bifurcate and extend outward from the tips of the connecting arm portions 153, and a ring-shaped outer chainwheel or sprocket 60 riveted to the eight chainwheel fixing portions 154.

Each of the chainwheel fixing portions 154 has a hole (not shown), which aligns with a hole (not shown) formed in outer sprocket 60. A rivet 63 is received in each of the holes of chainwheel fixing portions 154 and the corresponding hole of outer sprocket 60 to fixedly couple outer sprocket 60 to chainwheel plate 151. Of course, it will be apparent to those skilled in the art from this disclosure that bolts can be used instead of rivets 63.

Threaded attachment holes ( not shown) are formed in areas 155 between the connecting arm portions 153 and the chainwheel fixing portions 154. Sprocket 61 is attached to chainwheel plate 151 by threading the chain ring bolts 64 into the threaded attachment holes for coaxially mounting with the outer chainwheel or sprocket 60. In addition, threaded attachment holes 158 for attaching an inner chainwheel 62 to chainwheel plate 151 are integrally formed on the back surfaces of the connecting arm portions 153.

While only two embodiments have been chosen to illustrate the present invention, it will be apparent to those skilled in the art that various changes and modifications can be made therein without departing from the spirit and scope of the invention as defined in the appended claims.

What is claimed is:

1. A bicycle chainwheel plate for coupling to a bottom bracket, said bicycle chainwheel plate comprising:

a central crank attachment portion adapted to be fixedly coupled in a non-rotatable fashion to a spindle;

a plurality of connecting arm portions integrally formed with said crank attachment portion as a one-piece, unitary member, and extending outwardly and radially from said crank attachment portion; and a plurality of chainwheel fixing portions integrally formed with said connecting arm portions as a one-piece, unitary member, with each of said chainwheel fixing portions having a pair of outer attachment points for fixedly coupling a first ring-shaped sprocket thereto as a separate element, each of said chainwheel fixing portions being bifurcated and extending from said arm portions to form said pair of said outer attachment points.

2. A bicycle chainwheel plate according to claim 1, further comprising a plurality of inner attachment portions for attaching a second sprocket having a smaller diameter than said first sprocket such that said second sprocket is coaxially installed between said connecting arm portions and said chainwheel fixing portions.

3. A bicycle chainwheel plate according to claim 1, wherein said arm portions extend radially in four directions from said crank attachment portion.

4. A bicycle chainwheel plate according to claim 1, wherein said chainwheel fixing portions have holes for riveting said first sprocket thereto.

5. A bicycle chainwheel plate according to claim 1, further comprising a crank arm non-rotatably coupled to said central crank attachment portion.

6. A bicycle chainwheel plate according to claim 5, wherein said crank arm is integrally formed with said central crank attachment portion as a one-piece, unitary member.

7. A bicycle chainwheel plate according to claim 5, wherein said central crank attachment portion has a hole for receiving and fixedly coupling a portion of said crank arm therein.

8. A bicycle crank set for use in a bicycle drive train, said bicycle crank set comprising:

- a first ring-shaped sprocket with a first set of teeth and a plurality of connection points spaced about its periphery; and
- a chainwheel plate fixedly coupled to said first sprocket, said chainwheel plate including
    - a central crank attachment portion adapted to be fixedly coupled to a spindle,
    - a plurality of connecting arm portions integrally formed with said crank attachment portion as a one-piece, unitary member, and extending outwardly and radially from said crank attachment portion, and
    - a plurality of chainwheel fixing portions integrally formed with said connecting arm portions as a one-piece, unitary member and formed as a separate element from said first ring-shaped sprocket, with each of said chainwheel fixing portions having a pair of outer attachment points for fixedly coupling to said first ring-shaped sprocket, each of said chainwheel fixing portions being bifurcated and extending from said connecting arm portions to form said pair of said outer attachment points.

9. A bicycle crank set according to claim 8, further comprising a plurality of inner attachment points for detachably installing a second sprocket having a smaller diameter than said first sprocket such that said second sprocket is coaxially installed between said connecting arm portions and said chainwheel fixing portions.

10. A bicycle crank set according to claim 8, wherein said connecting arm portions extend radially in four directions from said crank attachment portion.

11. A bicycle crank set according to claim 8, wherein said first sprocket is riveted to said chainwheel fixing portions.

12. A bicycle crank set according to claim 8, further comprising a crank arm having a first end coupled to said crank attachment portion, and a second free end adapted to receive a pedal.

13. A bicycle crank set according to claim 12, wherein said crank arm is integrally formed with said central crank attachment portion as a one-piece, unitary member.

14. A bicycle crank set according to claim 12, wherein said central crank attachment portion has a hole for receiving and fixedly coupling a portion of said crank arm therein.

* * * * *